April 22, 1958     J. BERGER ET AL     2,831,397
PHOTOGRAPHIC OBJECTIVE
Filed Feb. 13, 1956
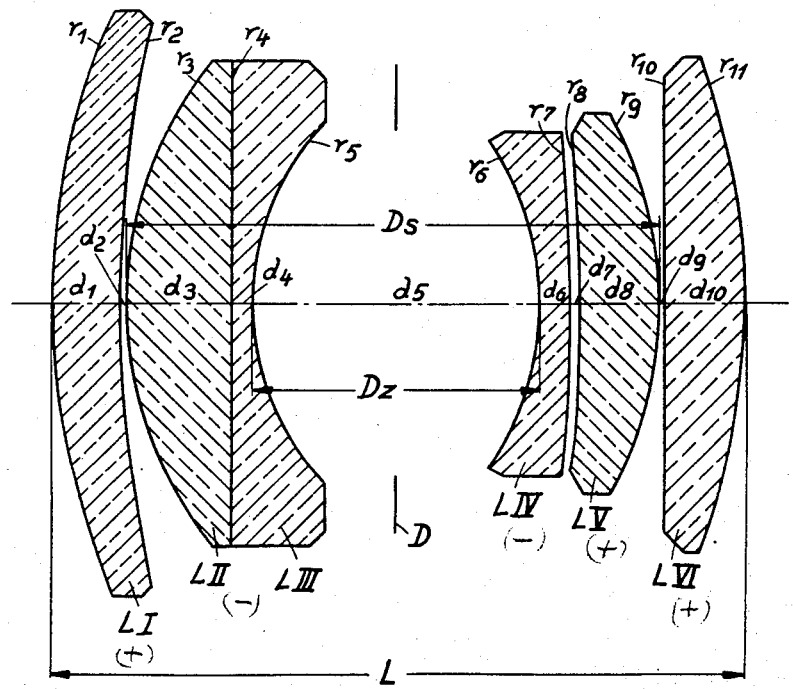

2,831,397
Patented Apr. 22, 1958

2,831,397

PHOTOGRAPHIC OBJECTIVE

Johannes Berger, Heidenheim (Brenz), and Guenther Lange, Konigsbronn, Germany, assignors to Carl Zeiss, Heidenheim (Brenz), Germany Application February 13, 1956, Serial No. 565,285

Claims priority, application Germany February 15, 1955

4 Claims. (Cl. 88—57)

The invention concerns photographic objectives for taking or reproduction consisting of six lenses, of which the first and the second are collective lenses, the third and fourth are dispersive lenses, and the fifth and sixth are collective lenses again, wherein the second and the third lenses are cemented together and wherein furthermore all surfaces whose radius of curvature is numerically smaller than the focal length turn their concave sides towards the diaphragm standing between the third and fourth lenses.

The investigations forming the basis of the invention have shown that a good compromise may be obtained between the aberrations of the axial bundle which determine the image quality on the one hand, and those of the oblique bundles on the other hand, if the following conditions according to the invention are simultaneously fulfilled.

$$0.50 \cdot f < D_s < 0.60 \cdot f$$
$$1.20 \cdot \bar{r}_s < D_s < 1.65 \cdot \bar{r}_s$$
$$0.35 \cdot f < \bar{r}_s < 0.45 \cdot f$$
$$0.24 \cdot f < D_s < 0.35 \cdot f$$
$$0.95 \cdot \bar{r}_s < D_s < 1.15 \cdot \bar{r}_s$$
$$0.25 \cdot f < \bar{r}_s < 0.30 \cdot f$$
$$0.60 \cdot f < L < 0.80 \cdot f$$
$$1.65 < \frac{n_{III} + n_V}{2} < n_{IV}$$
$$1.80 \cdot \bar{r}_s < D_s < 2.20 \cdot \bar{r}_s$$
$$0.90 \cdot r_5 < |r_6| < 1.20 \cdot r_5$$
$$0.002 \cdot f < d_7 < 0.022 \cdot f$$
$$0.08 \cdot f < d_3 + d_4 < 0.20 \cdot f$$
$$0.08 \cdot f < d_6 + d_7 + d_8 < 0.20 \cdot f$$
$$0.24 \cdot f < r_5 < 0.28 \cdot f$$
$$0.26 \cdot f < |r_6| < 0.32 \cdot f$$
$$0.23 \cdot f < D_s - D_z < 0.28 \cdot f$$

wherein the symbols have the significance listed in the following:

$f$ = the focal length of the objective $\bar{r}_s$ = the arithmetical mean of the absolute amounts of the radii of the two surfaces $r_3$ and $r_9$ $$\left(\bar{r}_s = \frac{r_3 + |r_9|}{2}\right)$$

$D_s$ = the separation of the apices of these two surfaces $\bar{r}_z$ = the arithmetical mean of the absolute amounts of the radii of the surfaces bordering upon the diaphragm space $$\left(\bar{r}_z = \frac{r_5 + |r_6|}{2}\right)$$

$D_z$ = the length of the diaphragm space = $d_5$ $L$ = the overall length of the objective = the separation of the apices of the two external surfaces $d_7$ = the airspace between the fourth and the fifth lenses $d_3$ = the axial thickness of the second lens $L_{II}$ $d_4$ = the axial thickness of the third lens $L_{III}$ $d_6$ = the axial thickness of the fourth lens $L_{IV}$ $d_8$ = the axial thickness of the fifth lens $L_V$ By the combination of these characteristics it is rendered possible according to the invention with objectives of great light-gathering power of a relative aperture of 1:2 to keep all aberrations relatively small especially to combine good central correction simultaneously with good correction of the oblique bundles.

In the illustration attached the schematic design of an objective according to the present invention is represented. In the tables given in the following numerical values are given for three objectives according to the invention. For these three examples one illustration only is shown since these examples are differentiated as far as the lens scheme is concerned only by the type of the cemented surface between the second and third lenses. In the case of embodiment I particularly the said cemented surface turns its concave side towards the first lens while in the embodiments II and III this cemented surface is a plane surface.

In the figure of the drawing and in the following embodiments there are designated By $L_I \ldots L_{VI}$ the lenses, By $r_1 \ldots r_{11}$ the radii, By $d_1 \ldots d_{10}$ the thicknesses and the air spaces between the individual members.

By $n_d$ the refractive indices, and by $v$ the Abbe numbers.

The values are referred to a focal length of $f = 1$. All embodiments have the aperture ratio 1:2 and an angle of field of approximately 27° on each side of the optical axis.

Embodiment I

[Back focal length $s' = +0.7139 \times f$]

| Lenses | Radii | Thicknesses and Separations | $n_d$ | $v$ |
|---|---|---|---|---|
| $L_I$ | $r_1 = +0.576504$ | $d_1 = 0.06049$ | 1.74400 | 44.9 |
|  | $r_2 = +1.25403$ | $d_2 = 0.00202$ |  |  |
| $L_{II}$ | $r_3 = +0.390902$ | $d_3 = 0.10586$ | 1.66672 | 48.4 |
| $L_{III}$ | $r_4 = -9.54018$ | $d_4 = 0.01512$ | 1.62004 | 36.3 |
|  | $r_5 = +0.263129$ | $d_5 = 0.28228$ |  |  |
| $L_{IV}$ | $r_6 = -0.288938$ | $d_6 = 0.02016$ | 1.74077 | 27.7 |
|  | $r_7 = -2.76739$ | $d_7 = 0.00605$ |  |  |
| $L_V$ | $r_8 = -2.10523$ | $d_8 = 0.10223$ | 1.74400 | 44.9 |
|  | $r_9 = -0.385317$ | $d_9 = 0.00202$ |  |  |
| $L_{VI}$ | $r_{10} = +16.2482$ | $d_{10} = 0.08469$ | 1.74400 | 44.9 |
|  | $r_{11} = -0.710286$ |  |  |  |

Embodiment II

[Back focal length $s'=+0.6836 \times f$]

| Lenses | Radii | Thicknesses and Separations | $n_d$ | $v$ |
|---|---|---|---|---|
| $L_I$ | $r_1=+0.577316$ | $d_1=0.06778$ | 1.74400 | 44.9 |
|  | $r_2=+1.31122$ | $d_2=0.00311$ |  |  |
| $L_{II}$ | $r_3=+0.391438$ | $d_3=0.10821$ | 1.66672 | 48.4 |
| $L_{III}$ | $r_4=\infty$ | $d_4=0.01710$ | 1.62536 | 35.6 |
|  | $r_5=+0.261622$ | $d_5=0.28451$ |  |  |
| $L_{IV}$ | $r_6=-0.293543$ | $d_6=0.03109$ | 1.74000 | 28.2 |
|  | $r_7=-2.77122$ | $d_7=0.00994$ |  |  |
| $L_V$ | $r_8=-2.07811$ | $d_8=0.08084$ | 1.74400 | 44.9 |
|  | $r_9=-0.388640$ | $d_9=0.00311$ |  |  |
| $L_{VI}$ | $r_{10}=+10.8747$ | $d_{10}=0.08395$ | 1.74400 | 44.9 |
|  | $r_{11}=-0.711298$ |  |  |  |

Embodiment III

[Back focal length $s'=+0.6883 \times f$]

| Lenses | Radii | Thicknesses and Separations | $n_d$ | $v$ |
|---|---|---|---|---|
| $L_I$ | $r_1=+0.576526$ | $d_1=0.06956$ | 1.74400 | 44.9 |
|  | $r_2=+1.29999$ | $d_2=0.00199$ |  |  |
| $L_{II}$ | $r_3=+0.393732$ | $d_3=0.10931$ | 1.66672 | 48.4 |
| $L_{III}$ | $r_4=\infty$ | $d_4=0.01590$ | 1.62536 | 35.6 |
|  | $r_5=+0.263151$ | $d_5=0.27726$ |  |  |
| $L_{IV}$ | $r_6=-0.293143$ | $d_6=0.01988$ | 1.72825 | 28.3 |
|  | $r_7=-2.76745$ | $d_7=0.00596$ |  |  |
| $L_V$ | $r_8=-2.13581$ | $d_8=0.09600$ | 1.74400 | 44.9 |
|  | $r_9=-0.393732$ | $d_9=0.01193$ |  |  |
| $L_{VI}$ | $r_{10}=+21.6682$ | $d_{10}=0.07155$ | 1.74400 | 44.9 |
|  | $r_{11}=-0.695123$ |  |  |  |

We claim:

1. A photographic objective for taking or for reproduction consisting of six lenses of which the first and the second are collective lenses, the third and fourth are dispersive lenses and the fifth and sixth are collective lenses again wherein the second and the third lenses are cemented together and wherein furthermore all surfaces whose radius is numerically smaller than the focal length turn their concave sides towards the diphragm standing between the third and fourth lenses, characterized in that the following conditions are simultaneously fulfilled:

$$0.50 \cdot f < D_s < 0.60 \cdot f$$
$$1.20 \cdot \bar{r}_s < D_s < 1.65 \cdot \bar{r}_s$$
$$0.35 \cdot f < \bar{r}_s < 0.45 \cdot f$$
$$0.24 \cdot f < D_z < 0.35 \cdot f$$
$$0.95 \cdot \bar{r}_z < D_z < 1.15 \cdot \bar{r}_z$$
$$0.25 \cdot f < \bar{r}_z < 0.30 \cdot f$$
$$0.60 \cdot f < L < 0.80 \cdot f$$
$$1.65 < \frac{n_{III}+n_V}{2} < n_{IV}$$
$$1.80 \cdot \bar{r}_s < D_s < 2.20 \cdot \bar{r}_s$$
$$0.90 \cdot r_5 < |r_6| < 1.20 \cdot r_5$$
$$0.002 \cdot f < d_7 < 0.022 \cdot f$$
$$0.08 \cdot f < d_3 + d_4 < 0.20 \cdot f$$
$$0.08 \cdot f < d_6 + d_7 + d_8 < 0.20 \cdot f$$
$$0.24 \cdot f < r_5 < 0.28 \cdot f$$
$$0.26 f < |r_6| < 0.32 \cdot f$$
$$0.23 \cdot f < D_s - D_z < 0.28 \cdot f$$

wherein the symbols have the significance listed in the following:

$f$ = the focal length of the objective $\bar{r}_s$ = the arithmetical mean of the absolute amounts of the radii of the two surfaces $r_3$ and $r_9$ $$\left(\bar{r}_s = \frac{r_3 + |r_9|}{2}\right)$$

$D_s$ = the separation of the apices of these two surfaces $\bar{r}_z$ = the arithmetical mean of the absolute amounts of the radii of the surfaces bordering upon the diaphragm space $$\left(\bar{r}_z = \frac{r_5 + |r_6|}{2}\right)$$

$D_z$ = the length of the diaphragm space $L$ = the overall length of the objective = the separation of the apices of the two external surfaces $d_7$ = the air space between the fourth and fifth lenses $d_3$ = the axial thickness of the second lens $L_{II}$ $d_4$ = the axial thickness of the third lens $L_{III}$ $d_6$ = the axial thickness of the fourth lens $L_{IV}$ $d_8$ = the axial thickness of the fifth lens $L_V$.

2. A photographic objective according to claim 1 characterized in that the individual powers of the refracting surfaces $(\Delta n/r)$ differ by a maximum of $\pm 0.5/f$ each and the distances $(d)$ of the individual surface apices differ by a maximum of $\pm 0.05 \cdot f$ each from the values taken from the following numerical example:

| Lenses | Radii | Thicknesses and Separations | $n_d$ | $v$ | $\Delta n/r$ |
|---|---|---|---|---|---|
| $L_I$ | $r_1=+0.576504 \cdot f$ | $d_1=0.06049 \cdot f$ | 1.74400 | 44.9 | $+1.290537/f$ |
|  | $r_2=+1.25403 \cdot f$ | $d_2=0.00202 \cdot f$ |  |  | $-0.593287/f$ |
| $L_{II}$ | $r_3=+0.390902 \cdot f$ | $d_3=0.10586 \cdot f$ | 1.66672 | 48.4 | $+1.705593/f$ |
| $L_{III}$ | $r_4=-9.54018 \cdot f$ | $d_4=0.01512 \cdot f$ | 1.62004 | 36.3 | $+0.004893/f$ |
|  | $r_5=+0.263129 \cdot f$ | $d_5=0.28228 \cdot f$ |  |  | $-2.356411/f$ |
| $L_{IV}$ | $r_6=-0.288938 \cdot f$ | $d_6=0.02016 \cdot f$ | 1.74077 | 27.7 | $-2.563768/f$ |
|  | $r_7=-2.76739 \cdot f$ | $d_7=0.00605 \cdot f$ |  |  | $+0.267678/f$ |
| $L_V$ | $r_8=-2.10523 \cdot f$ | $d_8=0.10223 \cdot f$ | 1.74400 | 44.9 | $-0.353406/f$ |
|  | $r_9=-0.385317 \cdot f$ | $d_9=0.00202 \cdot f$ |  |  | $+1.930877/f$ |
| $L_{VI}$ | $r_{10}=+16.2482 \cdot f$ | $d_{10}=0.08469 \cdot f$ | 1.74400 | 44.9 | $+0.045790/f$ |
|  | $r_{11}=-0.710286 \cdot f$ |  |  |  | $+1.047465/f$ | wherein $L_I \ldots L_{VI}$ are the lenses,
$r_1 \ldots r_{11}$ are the radii,
$d_1 \ldots d_{10}$ are the lens thicknesses and air spaces between the lenses,
$n_d$ are the refractive indices, and
$v$ are the Abbe numbers.

3. A photographic objective according to claim 1 characterized in that the individual powers of the refracting surfaces ($\Delta n/r$) differ by a maximum of $\pm 0.5/f$ each and the distances ($d$) of the individual surface apices differ by a maximum of $\pm 0.05 \cdot f$ each from the values taken from the following numerical example:

| Lenses | Radii | Thicknesses and Separations | $n_d$ | $v$ | $\Delta n/r$ |
|---|---|---|---|---|---|
| $L_I$ | $r_1=+0.577316 \cdot f$ | $d_1=0.06778 \cdot f$ | 1.74400 | 44.9 | $+1.288722/f$ |
|  | $r_2=+1.31122 \cdot f$ | $d_2=0.00311 \cdot f$ |  |  | $-0.567410/f$ |
| $L_{II}$ | $r_3=+0.391438 \cdot f$ | $d_3=0.10821 \cdot f$ | 1.66672 | 48.4 | $+1.703258/f$ |
| $L_{III}$ | $r_4=\infty$ | $d_4=0.01710 \cdot f$ | 1.62536 | 35.6 | $0.000000$ |
|  | $r_5=+0.261622 \cdot f$ | $d_5=0.28451 \cdot f$ |  |  | $-2.390319/f$ |
| $L_{IV}$ | $r_6=-0.293543 \cdot f$ | $d_6=0.03109 \cdot f$ | 1.74000 | 28.2 | $-2.520925/f$ |
|  | $r_7=-2.77122 \cdot f$ | $d_7=0.00994 \cdot f$ |  |  | $+0.267030/f$ |
| $L_V$ | $r_8=-2.07811 \cdot f$ | $d_8=0.08084 \cdot f$ | 1.74400 | 44.9 | $-0.358018/f$ |
|  | $r_9=-0.388640 \cdot f$ | $d_9=0.00311 \cdot f$ |  |  | $+1.914368/f$ |
| $L_{VI}$ | $r_{10}=+10.8747 \cdot f$ | $d_{10}=0.08395 \cdot f$ | 1.74400 | 44.9 | $+0.068416/f$ |
|  | $r_{11}=-0.711298 \cdot f$ |  |  |  | $+1.045975/f$ | wherein $L_I \ldots L_{VI}$ are the lenses,
$r_1 \ldots r_{11}$ are the radii,
$d_1 \ldots d_{10}$ are the lens thicknesses and air spaces between the lenses,
$n_d$ are the refractive indices, and
$v$ are the Abbe numbers.

4. A photographic objective according to claim 1 characterized in that the individual powers of the refracting surfaces ($\Delta n/r$) differ by a maximum of $\pm 0.5/f$ each and the distances ($d$) of the individual surface apices differ by a maximum of $\pm 0.05 \cdot f$ each from the values taken from the following numerical example:

| Lenses | Radii | Thicknesses and Separations | $n_d$ | $v$ | $\Delta n/r$ |
|---|---|---|---|---|---|
| $L_I$ | $r_1=+0.576526 \cdot f$ | $d_1=0.06956 \cdot f$ | 1.74400 | 44.9 | $+1.290488/f$ |
|  | $r_2=+1.29999 \cdot f$ | $d_2=0.00199 \cdot f$ |  |  | $-0.572312/f$ |
| $L_{II}$ | $r_3=+0.393732 \cdot f$ | $d_3=0.10931 \cdot f$ | 1.66672 | 48.4 | $+1.693334/f$ |
| $L_{III}$ | $r_4=\infty$ | $d_4=0.01590 \cdot f$ | 1.62536 | 35.6 | $0.000000$ |
|  | $r_5=+0.263151 \cdot f$ | $d_5=0.27726 \cdot f$ |  |  | $-2.376430/f$ |
| $L_{IV}$ | $r_6=-0.293143 \cdot f$ | $d_6=0.01988 \cdot f$ | 1.72825 | 28.3 | $-2.484282/f$ |
|  | $r_7=-2.76745 \cdot f$ | $d_7=0.00596 \cdot f$ |  |  | $+0.263148/f$ |
| $L_V$ | $r_8=-2.13581 \cdot f$ | $d_8=0.09600 \cdot f$ | 1.74400 | 44.9 | $-0.348346/f$ |
|  | $r_9=-0.393732 \cdot f$ | $d_9=0.01193 \cdot f$ |  |  | $+1.889610/f$ |
| $L_{VI}$ | $r_{10}=+21.6682 \cdot f$ | $d_{10}=0.07155 \cdot f$ | 1.74400 | 44.9 | $+0.034336/f$ |
|  | $r_{11}=-0.695123 \cdot f$ |  |  |  | $+1.070314/f$ | wherein $L_I \ldots L_{VI}$ are the lenses,
$r_1 \ldots r_{11}$ are the radii,
$d_1 \ldots d_{10}$ are the lens thicknesses and air spaces between the lenses,
$n_d$ are the refractive indices, and
$v$ are the Abbe numbers.

References Cited in the file of this patent

UNITED STATES PATENTS

| 2,349,893 | Warmisham et al. | May 30, 1944 |
| 2,735,340 | Aklin | Feb. 21, 1956 |

FOREIGN PATENTS

| 427,008 | Great Britain | Apr. 12, 1935 |
| 665,520 | Germany | Sept. 27, 1938 |
| 684,210 | Great Britain | Dec. 10, 1952 |